United States Patent [19]

Dahlstrom

[11] 4,003,457
[45] Jan. 18, 1977

[54] CLUTCH HAVING OVERSIZED ROLLERS
[75] Inventor: Arvid Dahlstrom, Chicago, Ill.
[73] Assignee: Dahltron Corporation, Oakbrook, Ill.
[22] Filed: Feb. 10, 1975
[21] Appl. No.: 548,598
[52] U.S. Cl. .................................. 192/45; 74/142
[51] Int. Cl.² .................................. F16D 41/06
[58] Field of Search ............ 192/44, 45; 188/82.84; 81/59.1

[56] References Cited
UNITED STATES PATENTS

| | | | |
|---|---|---|---|
| 2,023,961 | 12/1935 | Leichsenring, Jr. | 192/45 X |
| 2,391,350 | 12/1945 | Schmidt | 192/45 |
| 2,990,926 | 7/1961 | Padova | 192/45 |
| 3,054,489 | 9/1962 | Fahlberg | 192/45 |
| 3,194,368 | 7/1965 | Benson et al. | 192/45 |
| 3,590,667 | 7/1971 | Berglein | 81/59.1 |
| 3,732,957 | 5/1973 | McEwen | 192/45 |

Primary Examiner—Allan D. Herrmann
Attorney, Agent, or Firm—Roy E. Petherbridge; Robert L. Lindgren; Edward D. Gilhooly

[57] ABSTRACT

A clutch comprising a clutching member having a central aperture and channel means disposed therein, a clutched member disposed within the aperture and spaced apart from the clutching member, and clutch means disposed co-axially in the aperture between the clutching member and the clutched member. The clutch means include a plurality of force-transmitting rollers surrounding the clutched member and roller means larger in diameter than the force-transmitting rollers being spaced around the clutched member to support the clutching member on the clutched member independently of the force-transmitting rollers for rotation.

13 Claims, 9 Drawing Figures

CLUTCH HAVING OVERSIZED ROLLERS

BACKGROUND OF THE INVENTION

This invention relates generally to clutch mechanisms and more particularly, it relates to an improved clutch having oversized rollers.

In prior art clutches of the type utilizing rollers for achieving a clutching connection between a clutching member and a clutched member, the force-transmitting rollers are rolled "up" a ramp surface in channel means of the clutching member so as to create the clutching connection by pinching the force-transmitting rollers into engagement between the clutching member and the clutched member. For the purposes of completeness, reference is being made to my prior U.S. Pat. No. 3,557,631 which reissued as U.S. Pat. Re.No. 28122 and to my two co-pending U.S. applications, Ser. No. 506,538, now U.S. Pat. No. 3,930,416 and Ser. No. 506,594, now U.S. Pat. No. 3,951,005, wherein the clutches of the type having force-transmitting rollers for achieving a clutching connection is described and illustrated with application to a speed reducing mechanism.

In such prior art clutches, due to the weight of the driven shaft and the clutched member acting under the force of gravity on the lower force-transmitting rollers, difficulties have been encountered in providing a smooth and uniform movement of all of the force-transmitting rollers when they are urged in operation toward the narrow end of the channel means for engagement with the clutched member. In this particular situation, the upper force-transmitting rollers tend to move more readily into the narrow end of the channel means because of the action of gravity on the clutch members. On account of such gravitational forces and the fact that the upper rollers move more readily up the ramp, the lower rollers move into the narrow end of the channel means with greater difficulty and often not simultaneous with the upper rollers. This results in uneconomical and inefficient transfer of force or torque from the clutching member to the driven shaft. Further, when the force-transmitting rollers are returned to the larger end of the channel means (disengagement of the clutched member) additional difficulties have been encountered in providing an adequate friction free engagement between the clutching member and the clutched member again due to the weight of the clutched member.

Another problem exists in that the force-transmitting rollers become misaligned and askew to the axis of rotation of the driven shaft. This again results in an inefficient transfer of force. Additionally, in applications to a speed reducing mechanism (as in previously mentioned patents) having two arms each with a clutch associated therewith, the force-transmitting rollers are aligned serially and parallel to the axis of rotation of the driven shaft. In this case, a disadvantage occurs when the aligned force-transmitting rollers contact and rub against each other thereby making the force-transmitting rollers askew or cock-eyed and preventing a uniform and constant rate of rotation of the driven shaft or efficient transfer of forces between the clutching member and clutched member.

SUMMARY OF THE INVENTION

Accordingly, it is an object of the present invention to provide an improved clutch which overcomes each and every one of the various above-mentioned disadvantages. Another object of the present invention is to provide an improved clutch having oversized rollers disposed so as to facilitate a smooth movement of the force-transmitting rollers during engagement of the clutch and to provide a substantially friction free surface between the clutching member and the clutched member during disengagement of the clutch.

Still another object of the present invention is to provide an improved clutch with intermediate barrier means disposed between adjacent aligned force-transmitting rollers to prevent misalignment thereof during rotation of the clutched member.

In accordance with these aims and objectives, the present invention is concerned with the provision of a clutch comprising a clutching member having a central aperture and channel means disposed therein, a clutched member disposed within the aperture and spaced apart from the clutching member, and clutch means disposed co-axially in the aperture between the clutching member and the clutched member. The clutched means include a plurality of force-transmitting rollers surrounding the clutched member and roller means larger in diameter than the force-transmitting roller being spaced around the clutched member to support the clutching member on the clutched member independently of the force-transmitting rollers for rotation.

Additionally, barrier means are provided to prevent the force-transmitting rollers from becoming askewed and unparallel to the axis of rotation of the driven shaft.

BRIEF DESCRIPTION OF THE DRAWINGS

These and other objects and advantages of the present invention will become more fully apparent from the following detailed description when read in conjunction with the accompanying drawings, wherein.

DETAILED DESCRIPTION OF THE PREFERRED EMBODIMENT

It is to be distinctly understood at the outset that the present invention shown in association with a speed reducing mechanism is not intended to serve as a limitation upon the scope or teachings thereof, but is merely for the purpose of convenience of illustration of one example of its application. The present invention has numerous applications in other forms of machines since the invention pertains to a mechanism for providing a clutching connection between a clutching member and a clutched member.

Figure 1:
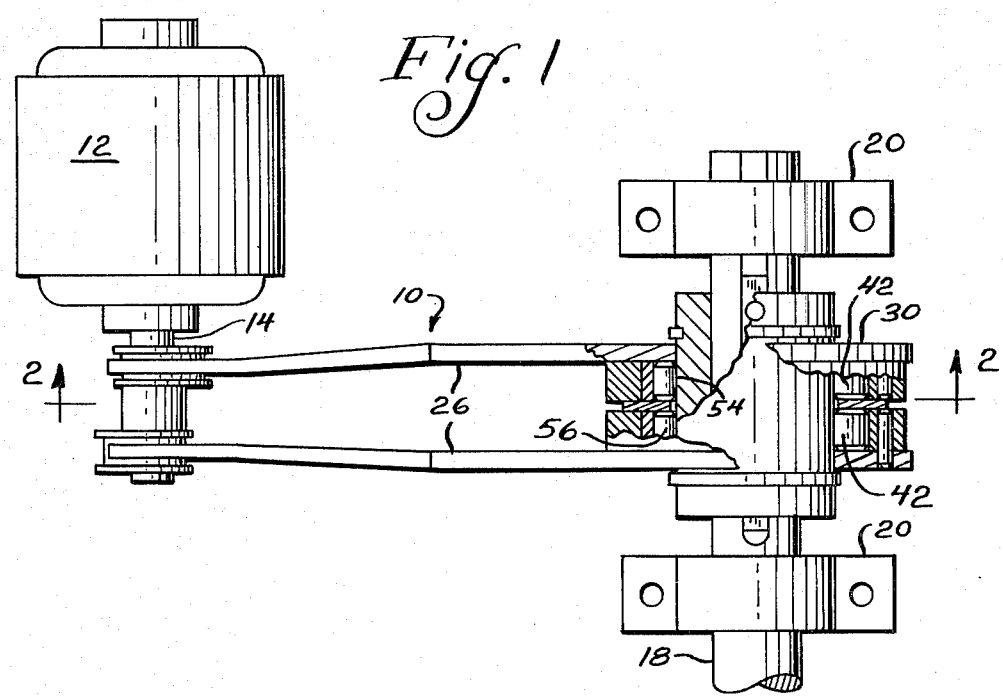
FIG. 1 is a top plan view of a clutch of the present invention showing a practical application thereof in connection with a speed reducing mechanism.

Referring now in detail to the drawings of the particular illustration, a speed reducing mechanism designated generally by reference numeral 10 is driven by an electric motor 12 having an output shaft 14. As shown in FIG. 1, the rotating power output shaft 14 is provided with a series of eccentrics 16, each being provided with an aperture through which the shaft 14 passes. It should be noted that any number of eccentrics can be provided on the shaft 14, but they must be angularly oriented to the axis of rotation of the shaft equally from each other in order that the assembly functions in an optimal manner, i.e., three eccentrics must be spaced apart by a 120°. The output shaft 14 transfers power to a driven output shaft 18 having its own independent set of bearings 20. However, it is also possible that the output shaft 18 be supported by bearing sets which are an integral part of the apparatus over which it is driving.

Figure 2:
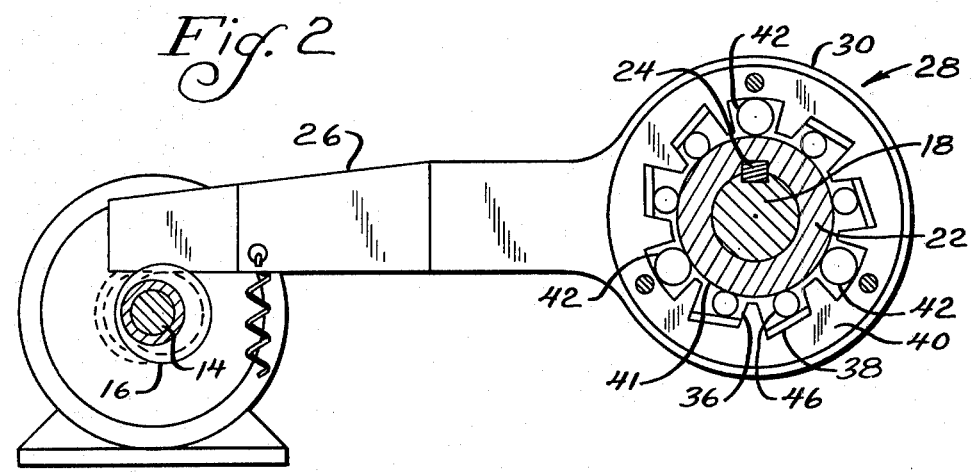
FIG. 2 is an elevational view taken along the lines 2—2 FIG. 1, looking in the direction of the arrows.

In FIG. 2, there is shown a preferred embodiment of the novel clutch having oversized rollers of the present invention which will be described in detail hereinafter. The output shaft 18 is adjacent and generally surrounding a sleeve or clutched member 22 removably secured by a key 24. The speed reducing mechanism extends between the output shaft 14 and the driven output shaft 18 via force transfer arms 26.

With reference to my previously mentioned applications and patents, and from a consideration of the clutch assembly 28 as shown in FIG. 2, a full and complete understanding of the operation of the clutch assembly will be seen. Very simply, as the eccentrics 16 rotate the arms 26 are moved alternately in a rapid up and down fashion (rocking motion). The end 30 of the arm 26 is provided with an aperture 32 having channel means 34 therein. As the arms 26 are moved upwardly by the eccentrics 16, the force-transmitting rollers 36 of the clutch assembly 28 are urged toward the narrow end of the channel means 34 and thereby pinching the force-transmitting rollers 36 between the bottom wall 38 of clutching member 40 and the outer surface 41 of the clutched member 22. In this pinching position defining clutch engagement, a force is transmitted through the clutched member 22 to the driven output shaft 18. When the force-transmitting rollers 36 are rolled toward the large end of the channel means 34, no locking action is effected between the clutching member 40 and the clutched member 22. In this latter position defining clutch disengagement, no force is transmitted through the clutched member 22 to the output shaft 18.

Figure 3:
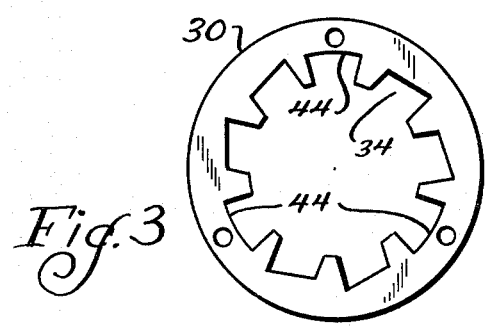
FIG. 3 is a side view of a representative clutching member.
Figure 4:
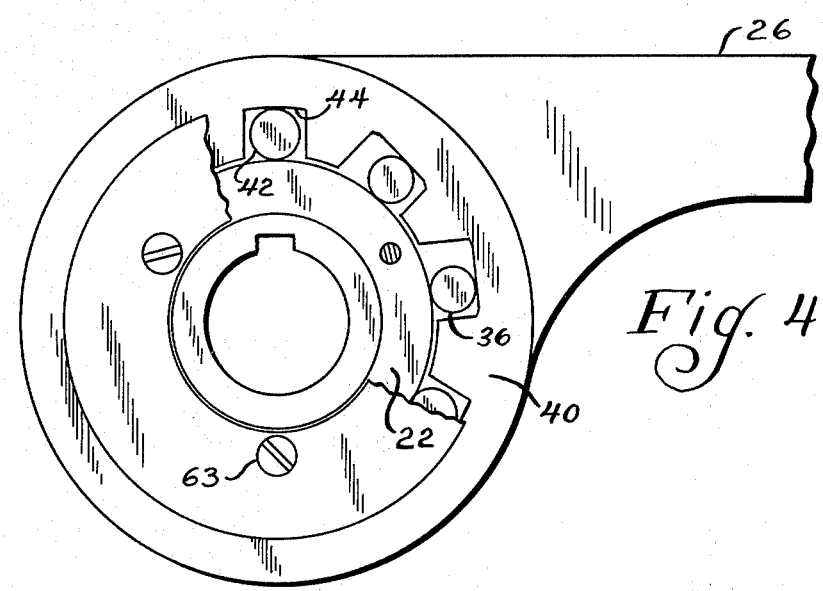
FIG. 4 is an enlarged detailed view of the clutch of the present invention.

The improvement of the clutch assembly 28 resides in three oversized rollers 42 positioned in rectangular slots 44 as shown in FIGS. 2, 3 and 4. The oversized rollers 42 are positioned in approximately equal spaced relationship 120° apart around the clutched member 22. It is to be understood that this is a preferred embodiment and that any number of oversized rollers may be used. Further, if more than one oversized roller is used, they do not necessarily have to be equally spaced around the clutched member. The rollers 42 maintain continuous engagement with the clutching member 40 and the clutched member 22. The roller 42 facilitates a smooth and uniform movement of the force-transmitting rollers 36 during clutch engagement since the lower force-transmitting rollers such as force-transmitting roller 46 is not effected by the weight of the driven shaft and clutched member acting on them due to gravity to prevent rotation thereof. Further, during clutch disengagement the rollers 42 provide a substantially friction free surface for rotation of the clutching member relative to the clutched member. Thus, the output shaft 18 can be rotated independently in a uniform and constant rate by virtue of the addition of the three oversized rollers 42.

Figure 5:
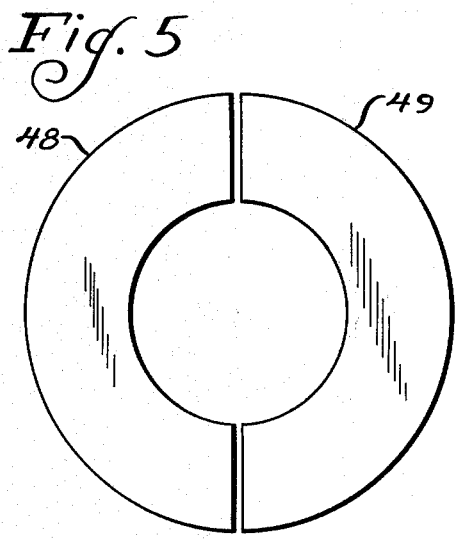
FIG. 5 is a view of an intermediate barrier plate.
Figure 8:
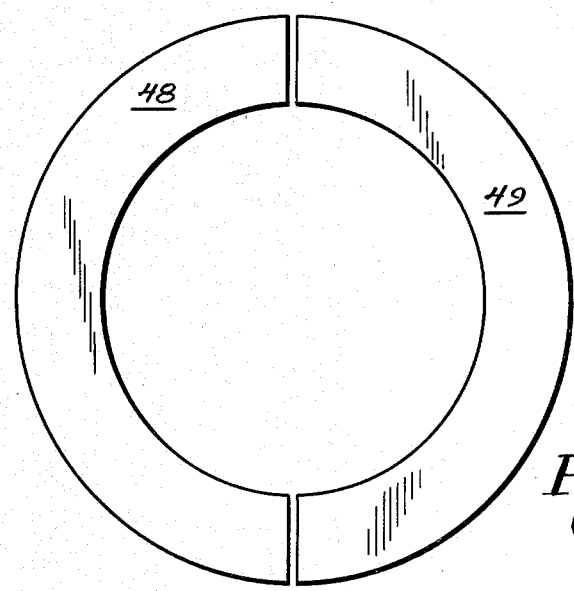
FIG. 8 is a view of an intermediate barrier plate for the second embodiment.

Referring now to FIG. 5, in order to provide an economical and efficient transfer of force or torque and to prevent thus the force-transmitting rollers 36 from becoming askewed or misaligned and unparallel to the axis of rotation of the driven output shaft 18, intermediate barrier means such as metal plate halves 48 and 49 (FIGS. 5 and 8) are press-fitted into recesses or grooves 50 on the outer surface 41 of the clutched member 22. It should be noted that the plate halves 48 and 49 can be mounted by any other convenient means. The intermediate barrier means prevent the adjacently disposed force-transmitting rollers such as force-transmitting rollers 54, 56 (FIG. 1) from rubbing or contacting each other so as to make them become askew or unparallel to the axis of rotation of the driven output shaft 18.

Figure 6:
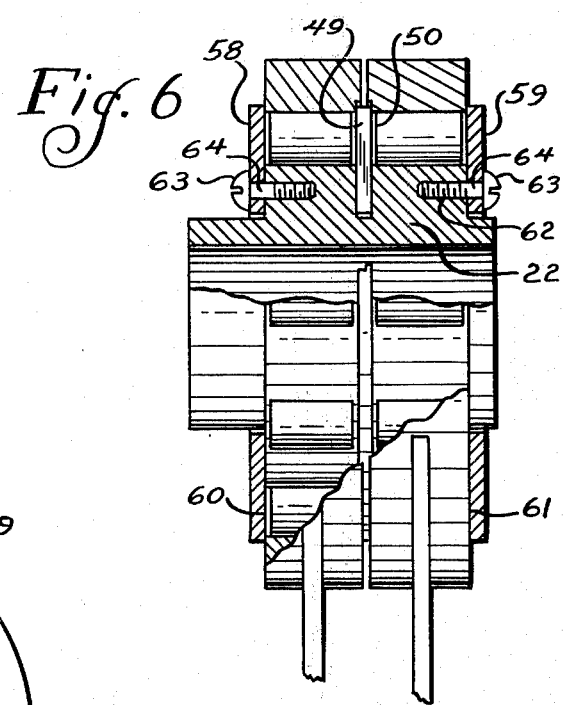
FIG. 6 is a partly sectionalized view of part of the clutch of the present invention.

As best seen in FIG. 6 end barrier means 58 and 59 are mounted on ends 60, 61 respectively, of the clutched member 22 and serve the same function as the intermediate barrier means. The end barrier means 58 and 59 are metal circular plates which are mounted on the ends 60, 61 by mounting means such as screws 63 threaded into tapped-holes 62 in the clutched member 22 via hole or aperture 64 in the circular plates.

Figure 7:
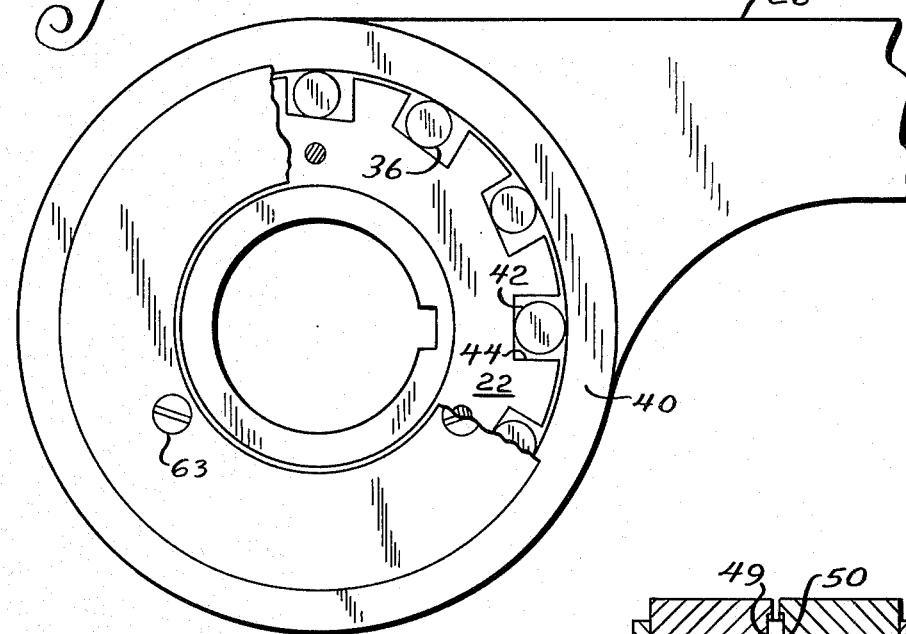
FIG. 7 is an enlarged and detailed view showing a second embodiment of the clutch.
Figure 9:
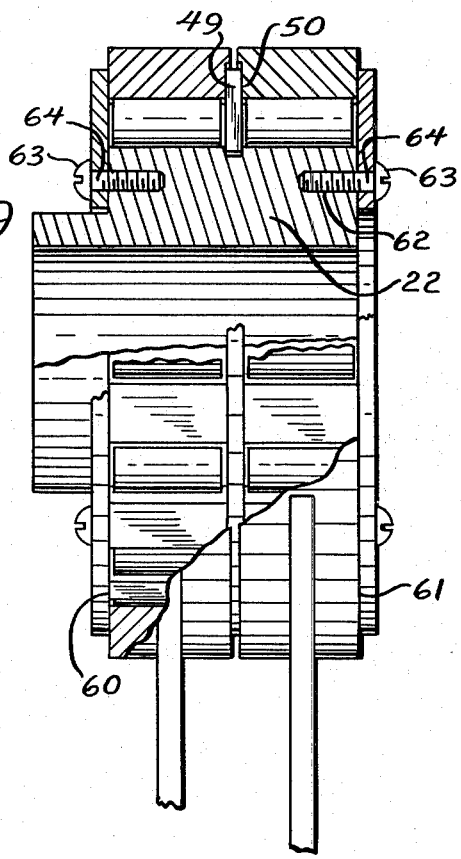
FIG. 9 is a partly sectionalized view of part of the second embodiment of the clutch.

In FIGS. 7 and 9, there is shown a second embodiment of the clutch assembly 28. It can be seen that in this embodiment the channel means 34, the force-transmitting rollers 36, and the oversized rollers 42 are located on the clutched member 22 rather than on the clutching member 40. The operation is exactly the same as the first embodiment. Further, it is to be understood that intermediate barrier means and end barrier means can be likewise provided.

While there has been illustrated and described what is at present to be a preferred embodiment of the present invention, it would be understood by those skilled in the art that various changes and modifications may be made and equivalence may be substituted for elements thereof without departing from the true scope of the invention. In addition, many modifications may be made to adapt a particular situation or material to the teachings of the invention without departing from the essential scope thereof. Therefore, it is intended that this invention not be limited to the particular embodiment disclosed as a best mode contemplated for carrying out this invention, but that the invention will include all embodiments falling within the scope of the appended claims.

What is claimed:
1. A clutch comprising:
a clutching member having a central aperture and channel means disposed therein;
a clutched member disposed within said aperture and spaced apart from said clutching member;
clutch means disposed co-axially in said aperture between said clutching member and said clutched member, said clutch means including a plurality of force-transmitting rollers surrounding said clutched member and roller means larger in diameter than the force-transmitting rollers being disposed around said clutched member to support said clutching member on said clutched member independently of said force-transmitting rollers for rotation; and said channel means comprising a series of transversely extending channels for carrying said force-transmitting rollers and a series of rectangular slots for carrying said roller means.

2. A clutch as claimed in claim 1, wherein said roller means comprise three oversized rollers positioned at approximately 120° spaced apart relationship around said clutched member.

3. A clutch as claimed in claim 1, further comprising intermediate barrier means mounted on said clutched member for preventing said force-transmitting rollers from becoming askew and unparallel to the axis of rotation of said clutched member.

4. A clutch as claimed in claim 3, further comprising end barrier means mounted on ends of said clutched member, each of said force-transmitting rollers being compartmentalized between said end and intermediate barrier means for aligning said force-transmitting rollers parallel to the axis of rotation of said clutched member.

5. A clutch as claimed in claim 1, wherein said roller means comprise at least one oversized roller disposed between said clutching member and said clutched member.

6. A clutch comprising:
a clutching member having a central aperture;
a clutched member disposed within the aperture and spaced apart from said clutching member, said clutched member having channel means disposed therein;
clutch means disposed co-axially in said channel means between said clutching member and said clutched member, said clutch means including a plurality of force-transmitting rollers surrounding said clutched member and roller means larger in diameter than said force-transmitting rollers being disposed around said clutched member to support said clutching member on said clutched member independently of said force-transmitting rollers for rotation; and
said channel means comprising a series of transversely extending channels for carrying said force-transmitting rollers and a series of rectangular slots for carrying said roller means.

7. A clutch as claimed in claim 6, wherein said roller means comprise three oversized rollers positioned at approximately 120° spaced apart relationship around said clutched member.

8. A clutch as claimed in claim 6, wherein said roller means comprise at least one oversized roller disposed between said clutching member and said clutched member.

9. A clutch as claimed in claim 6, further comprising intermediate barrier means mounted on said clutched member for preventing said force-transmitting rollers from becoming askew and unparallel to the axis of rotation of said clutched member.

10. A clutch as claimed in claim 9, further comprising end barrier means mounted on ends of said clutched member, each of said force-transmitting rollers being compartmentalized between said end and intermediate barrier means for aligning said force-transmitting rollers parallel to the axis of rotation of said clutched member.

11. A clutch comprising:
a clutching member having a central aperture and channel means disposed therein;
a clutched member disposed with said aperture and spaced apart from said clutching member;
clutch means disposed co-axially in said aperture between said clutching member and said clutched member, said clutch means including a at least one pair of force-transmitting rollers positioned co-axially adjacent said clutched member; and
barrier means mounted on said clutched member for preventing said force-transmitting rollers from becoming askew and unparallel to the axis of rotation of said clutched member, said barrier means including intermediate barrier means positioned on the outer surface of the clutched member between said at least one pair of force-transmitting rollers.

12. A clutch as claimed in claim 11, wherein said intermediate barrier means comprises a plate.

13. A clutch as claimed in claim 12, wherein said plate is formed in two halves.

* * * * *